July 13, 1954
E. G. BOICE
2,683,512
CLUTCH
Filed Nov. 9, 1949
2 Sheets-Sheet 1
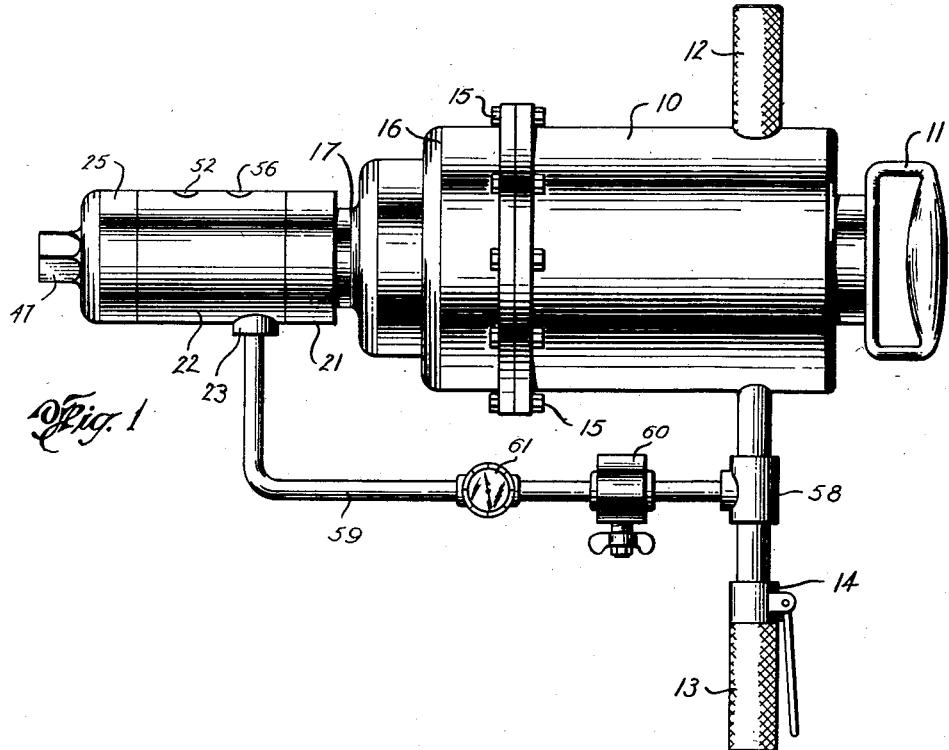
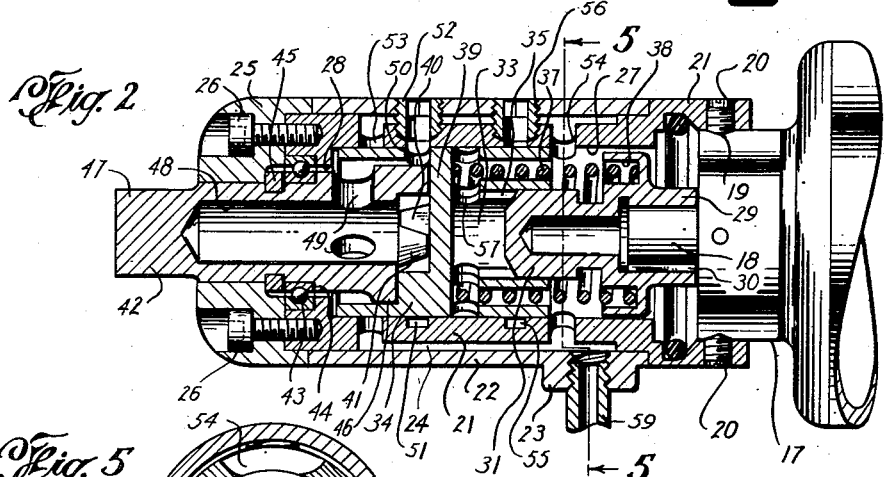
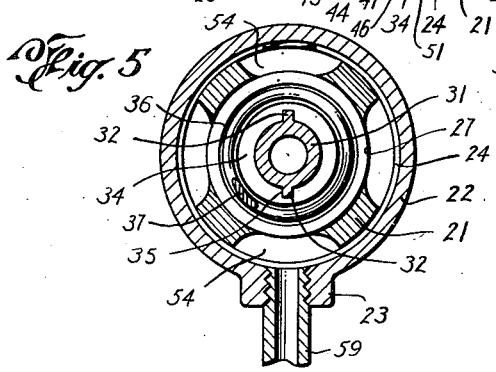
Elvin G. Boice
INVENTOR.
BY
ATTORNEY July 13, 1954     E. G. BOICE     2,683,512
CLUTCH
Filed Nov. 9, 1949     2 Sheets-Sheet 2
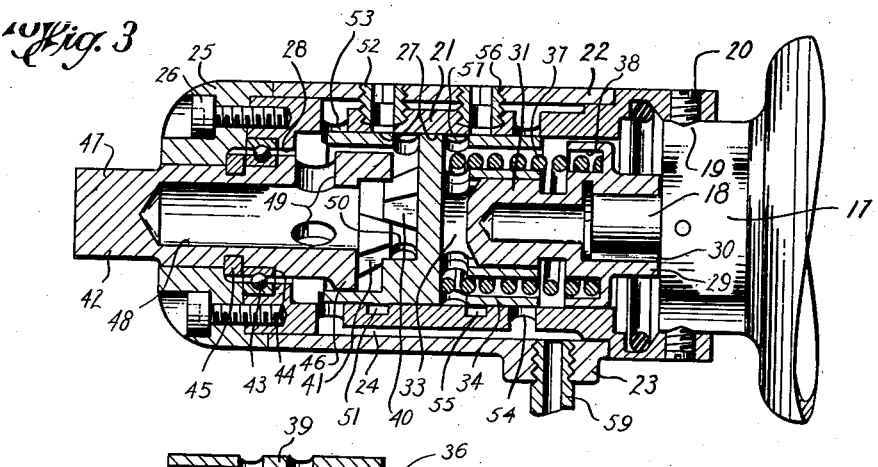
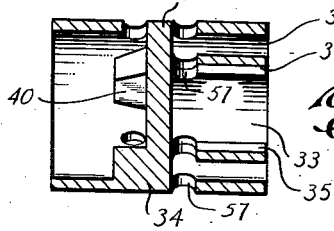
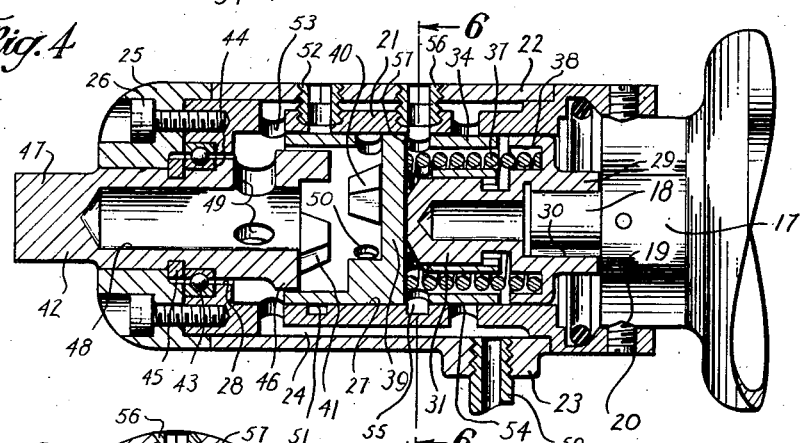
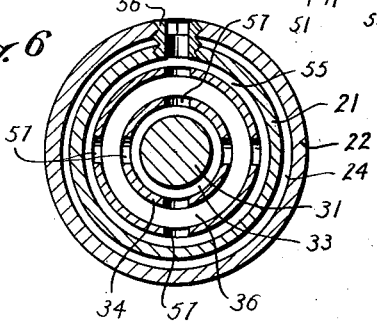
Elvin G. Boice
INVENTOR.
BY
ATTORNEY Patented July 13, 1954

2,683,512

UNITED STATES PATENT OFFICE 2,683,512

CLUTCH

Elvin G. Boice, Houston, Tex., assignor to Reed Roller Bit Company, Houston, Tex., a corporation of Texas Application November 9, 1949, Serial No. 126,430

8 Claims. (Cl. 192—56)

This invention relates broadly to clutches, but more particularly to torque responsive clutches used primarily in fluid actuated portable tools such as screw drivers and the like.

One object of this invention is to transmit torque between driving and driven shafts through a clutch mechanism capable of automatic release when the torque reaches a predetermined maximum.

Another object of this invention is to provide a torque responsive clutch with simple and efficient means assuring positive release of the clutch.

Another object of this invention is to provide a torque responsive clutch with means for automatically relieving the clutch jaws, prior to their complete disengagement, from torque pressure tending to effect wear and breakage of the extreme outer end portions of the jaws.

Another object of this invention is to produce a clutch capable of transmitting a controlled torque, the control being readily accessible to the operator, thereby rendering the tool with which the clutch is associated, applicable, for instance, for setting screws or the like of different sizes without necessitating the use of tools of different capacities.

Still another object of this invention is to provide a portable fluid actuated tool, such as a screw driver, with a fluid actuated torque responsive clutch, the fluid being preferably compressed air which, for the purpose of actuating the clutch, has its pressure regulated at the will of the operator for producing automatic clutch releases under different maximum torque loads.

A still further object of this invention is to produce a controlled torque transmitting clutch that operates in either direction.

Other objects and advantages more or less ancillary to the foregoing and the manner in which the various objects are attained, reside in the specific construction and aggroupment of the elements peculiar to this structure, as will become apparent from a more complete examination of this specification, in the claims of which there are assembled certain specific combinations of parts and specific constructions indicative of the scope or spirit of the invention.

Referring to the drawings, in which like symbols designate corresponding parts throughout the several views, Figure 1 is a diagrammatic plan view of a fluid actuated portable tool embodying the invention.

Figures 2, 3 and 4 are longitudinal sectional views of the clutch mechanism showing some of the parts in different positions.

Figure 5 is a cross sectional view taken through line 5—5 in Figure 2.

Figure 6 is a cross sectional view taken through line 6—6 in Figure 4.

Figure 7 is a longitudinal sectional view of one part of the clutch.

In the drawings, 10 represents a fluid actuated portable tool or motor provided with a back spade handle 11 and two side handles 12 and 13. The handle 13 has a throttle valve 14 affixed thereto, to which may be connected a motive fluid conveying conduit such as hose, not shown. From the hose the motive fluid, controlled by the valve 14, is free to flow through the handle 13 into the motor 10 for imparting rotation thereto in a manner well known in this art.

Secured to the main motor housing by bolts 15, there is a front housing 16 having a cylindrical outer end 17 of reduced diameter through which extends the motor shaft 18.

The tool or motor so far described is one of the conventional type, which includes a vane carrying rotor subjected to the action of the motive fluid or compressed air admitted through the throttle valve 14 for rotation in one or the other direction.

From the rotor, rotation is transmitted to the motor shaft 18 either directly or through any suitable gear transmission.

Referring now more particularly to the invention, the front end 17 of the motor 10 is provided wtih spaced detents 19 adapted to receive the pointed ends of set screws 20 through which a clutch housing 21 is secured to the motor 10 in axial alignment therewith. The clutch housing is cylindrical and has a stationary sleeve 22 mounted thereon and provided with a threaded connection 23 which opens into a cylindrical space or passageway 24 provided between the housing 21 and sleeve 22 intermediate the ends thereof. The outer end of the clutch housing is formed of a removable cap 25 held in position by screws 26.

Extending through the clutch housing 21, there is a relatively long cylindrical bore or chamber 27 ending by a reduced portion 28. A driving element 29 is located within the inner end portion of the bore 27 and connected to the motor shaft 18, for rotation therewith, by a key 30. This driving element has its inner end abutting against the motor housing front end 17, and has its head or outer end portion 31, normally cylindrical, provided with two diametrically opposed laterally extending lugs 32, Figure 5. The head 31 fits into the corresponding socket 33 of a driving clutch member 34, Figure 7, which socket has grooves 35 accommodating the lugs 32 through which rotation is transmitted from the driving element to the driving clutch member. Surrounding the socket 33, there is provided a relatively deep annular groove 36, on the bottom of which rests one end of a compression spring 37, while the other end rests on the bottom of a similar groove 38 provided in the driving element 29. Externally, the driving clutch member 34 is cylindrical and in rotatable guided engagement with the wall of the bore 27. It is divided by a partition or cross wall 39 forming two opposed pressure areas, one being the bottom of the socket 33, and the other the bottom of three driving jaws 40 which extend longitudinally therefrom in equal space relation with each other. Each side wall of the jaws is inclined or tapered outwardly to form with the cross wall 39 an obtuse angle, or when considered with a perpendicular to the cross wall, it forms an acute angle hereinafter referred to as driving angle.

The driving jaws 40 are engageable with similar driven jaws 41 provided on the inner end of a driven clutch member 42, which member is rotatably supported in a ball bearing 43 mounted in the reduced bore 28 of the clutch housing 21. Axial movement of the driven clutch member is prevented in one direction by an annular shoulder 44 resting against the inner cage of the ball bearing 43, and in the other direction by a split ring 45 carried by the member 42 and engaging the other side of the bearing 43. Driven clutch member 42 has its inner end portion provided with an annular flange 46 in slidable engagement with the interior of the driving member 34, and forming, together with the cross wall 39, steps engageable by the outer ends of the jaws for limiting the outward axial movement of the driving clutch member 34. Driven member 42 extends through the cap 25 where it is axially guided, and is terminated outside of the cap by a square or polygonal shank 47 adapted to drivingly receive a screw driver, socket wrench or any other work performing implement.

The driven member 42 is provided with a central bore 48 which is closed at one end, and has the other end opening through the inner end of the member. From this bore extends radial ports 49 opening in the driving member 34 below the annular flange 46. On the side of the partition 39 adjacent the driven member 42 and located between the jaws 40, there are provided radial ports 50 capable of registration with an annular groove 51 provided in the clutch housing bore 27, which groove is in constant communication with the exterior of the sleeve 22 through an exhaust bushing 52. The outer end of the cylindrical space or passageway 24 between housing 21 and sleeve 22 opens into a groove 53 which is similar to groove 51, while the other end portion of the passageway 24 opens into another similar groove 54. Adjacent this last groove, the bore 27 is provided with still another groove 55, which like groove 51 is in constant communication with the outside of the sleeve 22 through an exhaust bushing 56. Leading from the bottom of the socket 33 of the driving clutch member 34, there are a plurality of radial ports 57 capable of registration with the annular groove 55.

As clearly shown in Figure 1, the side handle 13 is provided with a T connection 58 from which motive fluid may be admitted into the connection 23 of the sleeve 22 through a conduit 59. In order to change or control the pressure of the motive fluid, such as compressed air, supplied to the clutch mechanism, there is incorporated in the conduit 59 a pressure regulator 60 and a pressure gauge 61. Since the regulator and gauge may be of any suitable type, no further description is thought necessary, other than pointing out that Figure 1 is primarily a diagrammatic view and that in practice the conduit 59 is preferably incorporated as a port inside of the motor housing 10.

In the operation of the device, with the throttle valve 14 open, motive fluid will flow through the handle 13 into the motor 10 for imparting rotation to the motor shaft 18 in one or the other direction, the direction of rotation being selective through a rotation control valve, not shown. From the motor shaft 18 rotation is transmitted to the driving element 29 through the key drive 30, and therefrom to the clutch driving member 34 through the spline connection 32—35. With the driving member 34 in the position shown in Figure 2, the driving jaws 40 are in operative engagement with the driven jaws 41 of the driven clutch member 42 for transmitting rotation thereto. From the shank 47, rotation may be transmitted to any desired tool implement mounted thereon for rotation therewith to perform the work, which tool implement is hereinafter referred to as a screw driver.

The driving clutch member 34 which is rotatable and slidable relative to the driven clutch member 42, is shifted and maintained in the position shown in Figure 2, that is, in full driving engagement with the driven member 42, by the action of the compression spring 37, and the action of motive fluid under controlled pressure admitted into the connection 23 through the conduit 59. From the connection 23 it will flow into the cylindrical passageway 24 and grooves 53 and 54. In this driving position of the clutch, the groove 53 is covered or closed by the outer end portion of the clutch driving member 34, in which portion is located the clutch jaws and annular flange 46 of the clutch driven member 42. While the groove 53 is closed by the driving member, the groove 54 is opened, enabling motive fluid to flow into the bore 27 to act on the inner end of the driving member 34, and into the socket 33 through the relatively deep annular groove 36 and radial ports 57, thereby creating pressure against the partition 39 to cooperate with the spring 37 for holding the driving member 34 in operative engagement with the driven member 42. Simultaneously the other side of the partition 39 is vented to the atmosphere through the radial ports 50, annular groove 51 and exhaust bushing 52.

The driving angle of the jaws 40 and 41 is such that when the torque is transmitted from the motor shaft 18 to the driving member 34, there will be a tendency to force the driving member away from the driven member, that is, cause the disengagement of the clutch. The amount of torque transmittable from motor shaft 18 to driven shank 47 will depend on the angular relationship of the clutch jaws 40 and 41, the coefficient of friction between the engaged faces of the jaws, and to the force or pressure applied on the driving member 34 in a direction opposing the inner movement or release of the clutch member 34, which pressure may be referred to as clutch engaging pressure.

When the torque of the shank 47 exceeds the clutch engaging pressure, the driving clutch member 34 will move inwardly or away from the driven clutch member to be released from driving engagement therewith. This clutch release movement is effected by virtue of the angular relationship of the jaws 40 and 41, which perform as cams acting against each other for causing axial movement of the driving member 34 relative to driven member 42.

As the clutch jaws 40 and 41 reach partial disengagement, as shown in Figure 3, the outer end of the driving member 34 will uncover the annular groove 53 while the inner end of the driving member will cover the groove 54, thereby admitting motive fluid on the outer side of the partition 39 and outer end of the driving member for automatically shifting the driving member against the effort of the spring 37, or into clutch release position. With the groove 53 opened, it will be noticed that the radial ports 50, heretofore affording communication of the outer or front end of the driving member with the atmosphere through the groove 51, have moved out of registration with groove 51. It will also be noticed that the motive fluid previously admitted in the inner or rear end of the driving member to cooperate with the spring 37, is now free to exhaust via the radial ports 57, exhaust groove 55 and exhaust bushing 56, thereby leaving only the spring 37 to exert pressure in a direction opposed to the release movement of the driving member. Admission of motive fluid on the front end and exhaust from the rear end of the driving member are calculated to take place and to become effective to release the clutch before complete disengagement of the clutch through the camming action of the jaws against each other, thereby relieving the extreme outer end portions of the jaws 40 and 41 from having to be subjected to torque pressure for effecting final release of the clutch. In other words, initial release movement of the clutch is effected through the camming action of the inclined side walls of the jaws 40 and 41 subjected to torque, which results in the rotary and axial release movement of the driving member 34, while the final release movement is effected only by the action of the pressure fluid admitted through the groove 53, which results in the axial movement of the driving member 34 without rotation.

When the clutch is fully released as shown in Figure 4, as long as the throttle valve 14 remains open, the motive fluid will be supplied to the front end of the driving member 34, in the manner above described, to maintain the clutch in released position.

When it is desired to re-engage the clutch, the throttle valve 14 will have to be momentarily shut off to enable the motive fluid in the front end of the driving member 34 to exhaust therefrom via the tube or port 59, handle 13 and the exhaust passage of the motor 10. In other words, upon closing the throttle valve 14, pressure fluid previously admitted into the motor 10 is free to exhaust therefrom, and with that pressure fluid will also exhaust the fluid previously admitted into the front end of the driving member 34. Upon the exhaust of the motive fluid from the front end of the driving clutch member 34 through the groove 53 and cylindrical passageway 24, the compression spring 37 will return the driving member into operative engagement with the driven member 42 as shown in Figure 2. When the throttle valve is again open, motive fluid will again be admitted into the motor 10 for rotating the shaft 18 and into the bore 27 behind the driving member 34 for exerting pressure thereon together with the spring 37 and maintain the driving member in operative engagement.

Since the torque capacity of the clutch is responsive to the pressure of the motive fluid on the driving clutch member 34, it will be understood that this torque capacity may be changed by changing the pressure of the motive fluid. To that end, there is incorporated between the handle 13 and connection 23, a pressure regulator of any suitable design diagrammatically shown at 60 in Figure 1. By simple adjustment of the regulator, it is possible to either increase or decrease the amount of torque required to effect the disengagement of the clutch, thereby enabling the tool to perform work requiring different torques, such as driving screws of different sizes, without necessitating complicated adjustments or having to change from one size tool to another.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a clutch, a housing with a pair of axially aligned clutch members therein having interengageable clutch jaws on their opposed faces for transmitting torque from one to the other, said jaws having a driving angle effecting jaw disengaging movement of one of said members when said torque reaches a predetermined maximum, a pressure fluid responsive actuating area on said one member for effecting said movement after initial disengagement of said jaws, a pressure fluid supplying passageway in said housing, and a source of communication between said passageway and actuating area opened by said member during its jaw disengaging movement by virtue of said driving angle for admitting pressure fluid to said area.

2. In a clutch, a housing with a pair of axially aligned clutch members therein having interengageable clutch jaws on their opposed faces for transmitting torque from one to the other, said jaws having a driving angle effecting jaw disengaging movement of one of said members when said torque reaches a predetermined maximum, a compressed air supplying passageway in said housing, and a source of communication between said passageway and opposed faces for supplying compressed air to said faces and assisting in effecting jaw disengaging movement of said one member, said source of communication being normally closed by said member but opened thereby during the early stage of its jaw disengaging movement.

3. In a clutch, a housing with a pair of axially aligned clutch members therein having interengageable clutch jaws on their opposed faces for transmitting torque from one to the other, said jaws having a driving angle effecting jaw disengaging movement of one of said members when said torque reaches a predetermined maximum, a pressure responsive first area on said member normally maintaining it in jaw interengaging position, a pressure responsive second area on said member opposed to the first one for assisting in effecting said movement, a pressure fluid supplying passageway in said housing, a first and second inlet port supplying pressure fluid from said passageway each to its named area, said first and second inlet ports being opened and closed respectively by said member when in jaws interengaging position and reversedly controlled by said member during its jaw disengaging movement but prior to complete disengagement of said jaws.

4. In a clutch, a pair of axially aligned clutch members having interengageable clutch jaws for transmitting torque from one to the other, said jaws having a driving angle effecting jaw disengaging movement of one of said members when said torque reaches a predetermined maximum, a pressure responsive area on said member having compressed air supplied thereto for maintaining said member in jaw engaging position before said torque reaches said maximum, means including an inlet port for supplying pressure fluid to said area, an outlet port for exhausting pressure fluid from said area, said inlet and outlet ports being opened and closed respectively by said member when in jaws interengaging position and reversedly controlled by said member when in jaws disengaged position.

5. In a clutch, a housing with a pair of axially aligned clutch members therein having interengageable clutch jaws for transmitting torque from one to the other, one of said members being axially movable relative to the other for effecting disengagement of said jaws, said jaws having a driving angle effecting initial axial movement of said one member and partial disengagement of said jaws when said torque reaches a predetermined maximum, a pressure fluid supplying passageway in said housing, a pressure area on said member effecting the last stage of its axial movement and complete disengagement of said jaws when pressure fluid is supplied thereon, an exhaust port normally releasing pressure from said area, an inlet port between said passageway and pressure area for admitting pressure fluid thereon, said exhaust port being normally opened and said inlet port closed by said member but reversedly controlled thereby during its initial axial movement.

6. In a clutch, a housing with a pair of axially aligned clutch members therein having interengageable clutch jaws on their opposed faces for transmitting torque from one to the other, one of said members being capable of jaws disengaging movement, said jaws having a driving angle initiating said jaw disengaging movement when said torque reaches a predetermined maximum, a pressure fluid supplying passageway in said housing, and a source of communication between said passageway and said opposed faces supplying motive fluid to said faces for concluding said jaw disengaging movement, said source of communication being normally closed by said member but opened thereby during its initial jaw disengaging movement.

7. In a clutch, a housing with a pair of axially aligned clutch members therein having interengageable clutch jaws for transmitting torque from one to the other, one of said members being axially movable relative to the other for effecting disengagement of said jaws, said jaws having a driving angle effecting initial axial movement of said member and partial disengagement of said jaws when said torque reaches a predetermined maximum, opposed pressure areas on said one member, a pressure fluid supplying passageway in said housing, inlet ports between said passageway and pressure areas, exhaust ports from said areas to the atmosphere, said ports controlled by said member for admitting pressure fluid on one of said areas and exhausting it from the other when said jaws are in operative engagement and for reversing the admission and exhaust of pressure fluid on said areas upon the initial axial movement of said members.

8. In a clutch, a housing having a pair of torque transmitting interengaging clutch members therein, one of which is capable of clutch releasing movement, cooperating cam means between said members effecting said movement when said torque reaches a predetermined maximum, an actuating area for said one member effecting said movement independently of said cam means upon supply of compressed air thereon, a compressed air supplying passageway in said housing, and an inlet port connecting said passageway to said area normally covered by said member, said port being uncovered during clutch releasing movement of said member for admitting compressed air to said area.

References Cited in the file of this patent

UNITED STATES PATENTS

| Number | Name | Date |
|---|---|---|
| 1,823,426 | Ferris | Sept. 15, 1931 |
| 1,881,728 | Levedahl | Oct. 11, 1932 |
| 1,919,437 | LeFerve | July 25, 1933 |
| 2,268,412 | McCombs | Dec. 30, 1941 |
| 2,277,554 | McCoy | Mar. 24, 1942 |
| 2,293,787 | Worden | Aug. 25, 1942 |
| 2,436,947 | Vergne | Mar. 2, 1948 |

FOREIGN PATENTS

| Number | Country | Date |
|---|---|---|
| 137,220 | Great Britain | Jan. 8, 1920 |